(12) United States Patent
Imai et al.

(10) Patent No.: US 6,436,868 B1
(45) Date of Patent: Aug. 20, 2002

(54) COMPOSITE CATALYST COMPOSITION FOR INHIBITING GENERATION OF DIOXIN

(75) Inventors: Tomoyuki Imai, Hiroshima; Satoshi Hatakeyama, Hiroshima-ken; Toshiki Matsui; Yasuhiko Fujii, both of Hiroshima; Tomoko Okita, Hatsukaichi; Hiroshi Inoue, Okayama; Masaki Ishihara, Okayama-ken; Masayuki Ukita, Okayama, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/612,390

(22) Filed: Jul. 7, 2000

(30) Foreign Application Priority Data

Jul. 9, 1999 (JP) .............................................. 11-196686

(51) Int. Cl.⁷ .......................... B01J 21/18; B01J 23/745
(52) U.S. Cl. ................ 502/185; 423/240 S; 423/245.3; 588/207; 502/338
(58) Field of Search .......................... 423/245.1, 245.3, 423/240 R, 240 S, 632, 633; 502/336, 185, 184, 338; 588/205, 206, 207, 210, 211, 212

(56) References Cited

U.S. PATENT DOCUMENTS

| | | | |
|---|---|---|---|
| 5,387,734 A | | 2/1995 | Hagenmaier et al. ....... 588/207 |
| 5,488,023 A | * | 1/1996 | Gadkaree et al. ........... 502/182 |

FOREIGN PATENT DOCUMENTS

| | | |
|---|---|---|
| DE | 34 43 722 A1 | 6/1986 |
| DE | 40 12 982 A1 | 10/1991 |
| EP | 0 702 078 A1 | 3/1996 |
| WO | WO 97/12672 | 4/1997 |

* cited by examiner

Primary Examiner—Wayne A. Langel
Assistant Examiner—Maribel Medina
(74) Attorney, Agent, or Firm—Nixon & Vanderhye P.C.

(57) ABSTRACT

The present invention relates to a process for treating a dioxin-containing exhaust gas which can inhibit the generation of dioxin occurring either in the course of cooling of the exhaust gas between a downstream portion subsequent to a combustion chamber and a dust collector or due to a memory effect upon low-temperature combustion in flues or dust collector at the start-up or shut-down of intermittent operation-type solid waste incinerators, without large-scale incineration facilities or plant renovation and equipment investment, and a composite catalyst composition for inhibiting the generation of dioxin, comprising an iron compound, an acid gas neutralizing agent and optionally an activated carbon.

9 Claims, 1 Drawing Sheet

FIG.1

COMPOSITE CATALYST COMPOSITION FOR INHIBITING GENERATION OF DIOXIN

BACKGROUND OF THE INVENTION

The present invention relates to a process for treating a dioxin-containing exhaust gas and a composite catalyst composition for inhibiting the generation of dioxin, and more particularly, to a process for treating a dioxin-containing exhaust gas discharged from intermittent operation-type solid waste incineration facilities such as mechanical batch incinerators or semi-continuous incinerators as well as continuous operation-type solid waste incineration facilities, and a composite catalyst composition for inhibiting the generation of dioxin. Still more particularly, the present invention relates to a process for treating a dioxin-containing exhaust gas which can inhibit the generation of dioxin occurring either in the course of cooling of the exhaust gas between a downstream portion subsequent to a combustion chamber and a dust collector or due to a memory effect upon low-temperature combustion in flues or dust collector at the start-up or shut-down of intermittent operation-type solid waste incineration facilities, without large-scale incineration facilities or plant renovation and equipment investment, and a composite catalyst composition for inhibiting the generation of dioxin.

Upon waste disposal, various wastes such as municipal solid wastes or the like have been divided into reusable ones and the others. After the reusable ones are recovered as effective resources, remaining combustible wastes have been usually incinerated. Incinerators used for waste disposal are classified into four types according to its operation time a day (i.e., into mechanical batch incinerators, fixed batch incinerators, semi-continuous incinerators and full-continuous incinerators). In Japan, about 24% of these incinerators are of a large-scale continuous operation type. Whereas the waste incineration has been still conducted using intermittent operation-type incineration facilities such as mechanical batch incinerators or semi-continuous incinerators.

At present, dioxin contained in exhaust gas discharged from waste incineration facilities causes significant social problems. It is suggested that the dioxin is generated due to incomplete combustion in a combustion chamber or in the course of cooling between a downstream portion subsequent to the combustion chamber and a dust collector. The dioxin is extremely toxic and is considered to promote a carcinogenesis. Also, the dioxin is undecomposable in natural environment, and therefore, when being taken into human bodies through water or foods, the dioxin is accumulated within the human bodies. For these reasons, it is necessary to reduce the amount of dioxin generated to as small a level as possible.

In the continuous operation-type solid waste incineration facilities, wastes can be continuously incinerated in a combustion chamber thereof at an elevated temperature and, therefore, are readily subjected to complete combustion, so that the amount of dioxin generated in the combustion chamber can be limited to a low level. However, it has been reported that dioxin is generated in the course of cooling of exhaust gas between a downstream portion subsequent to the combustion chamber and a dust collector due to a so-called "de novo" synthesis (H. Huang et al., "Chemosphere", 31, 4099(1995)). Even the continuous operation-type solid waste incineration facilities still fail to prevent the generation of dioxin in the course of cooling of the exhaust gas between a downstream portion subsequent to the combustion chamber and the dust collector to a sufficient extent.

Also, in the intermittent operation-type incineration facilities, dioxin tends to be generated in the course of cooling of the exhaust gas between a downstream portion subsequent to the combustion chamber and the dust collector like the continuous operation-type ones.

In particular, the intermittent operation-type incineration facilities are operated at predetermined time intervals. Accordingly, it takes several hours from the start-up until the incinerator can be operated in a steady state. At every start-up operation, there is caused a low-temperature combustion condition in which the dioxin tends to be generated. Also, when the incinerator is stopped, a part of the solid wastes is continued to smolder while causing incomplete combustion thereof. In such a case, when the incinerator is started up again, unburned substances caused due to incomplete combustion upon the shut-down of the incinerator on the previous day and upon the start-up thereof on the next day, still remain inside flues or dust collector of the incinerator. In consequence, there has been pointed out a disadvantage that such a so-called memory phenomenon that dioxin is re-synthesized and then discharged into an exhaust gas even though the temperature of the exhaust gas is as low as not more than 200° C., is caused and continued for several hours after the start-up of the incinerator (refer to Kawakami, Mtsuzawa and Tanaka, "Proceeding of the 5th Annual Conference of Japan Society of Waste Management Experts", p. 264 (1994)). Thus, it has been reported that the intermittent operation-type incineration facilities generate a larger amount of dioxin as compared to that of continuous operation-type ones.

The amount of dioxin generated from waste incinerators has been legally strictly limited. The Ministry of Health and Welfare has planned to replace these intermittent operation-type incineration facilities with continuous operation-type ones hereafter. Further, according to "the Air Pollution Control Act" enforced on Dec. 1, 1997, the upper limit of amount of dioxin discharged from incinerators has been regulated. Unless the upper limit (new incinerators: 0.1 to 5 ngTEQ/Nm$^3$, existing incinerators: 1 to 10 ngTEQ/Nm$^3$, according to scales of incineration facilities) is reached within 5 years henceforth, the deficient incinerators must be scrapped.

However, due to the financial problems of local governments, etc., it is difficult to scrap the existing incinerators and construct news incinerators instead. For this reason, there has been studied a method of overcoming the regulation while continuously using the existing incinerators.

Therefore, it has been strongly required to provide a process for treating an exhaust gas so as to prevent the generation of dioxin without a large-scale incineration facilities or plant renovation and equipment investment.

Hitherto, as the prior arts relating to absorption or decomposition of dioxin generated upon incineration of the wastes, various methods have been reported. For example, there are known a method of decomposing poly-halogenated aromatic compounds having at least five carbon atoms by heating at a temperature of 200 to 550° C. in the presence of a catalyst such as iron oxide (Japanese Patent Publication (KOKOKU) No. 6-38863(1994)); a method of removing halogenated aromatic compounds or the like from an exhaust gas or reducing amounts thereof by heat-treating at a temperature of 300 to 700° C. in the presence of a catalyst containing iron oxide (Japanese Patent Application Laid-Open (KOAKI) No. 2-280816(1990)); a method of conducting the incineration of wastes under the coexistence of calcium carbonate particles and iron oxide particles in an incinerator (Japanese Patent Application Laid-Open (KOAKI) No. 8-82411 (1996)); a method of adding a mixture of calcium hydroxide powder and activated carbon powder into exhaust gas flues in an incinerator (Japanese Patent Application Laid-Open (KOAKI) No. 11-63467(1999)); a method of introducing a blowing agent composed of calcium hydroxide and a porous inorganic oxide material (at least one material selected from the group consisting of clay minerals such as silicic acid, aluminum silicate, magnesium silicate, synthetic silicic acid, synthetic aluminum silicate, synthetic magnesium silicate, acid clay, activated clay, kaolin, bentonite, allophane and diatomaceous earth, and substances obtained by treating these clay minerals with acids to remove impurities such as aluminum and magnesium therefrom) into an exhaust gas passing through flues of an incinerator (Japanese Patent Application Laid-Open (KOAKI) No. 11-33343(1999)); a method of purifying an exhaust gas using a reactive calcium hydroxide-based cleaning agent (Japanese Patent No. 2602085); or the like.

In addition, as the methods of preliminarily mixing wastes with iron oxide or the like and then incinerating the wastes, there are known a method of burning combustible wastes at a temperature of not less than 850° C. under the coexistence of an acid gas neutralizing agent, iron oxide particles and the like (Japanese Patent Application Laid-Open (KOAKI) No. 8-270924(1996)); and a method of burning wastes in an incinerator under the coexistence of ferric iron oxide hydroxide particles or iron oxide particles containing sulfur and sodium in not more than predetermined amounts (Japanese Patent Application Laid-Open (KOAKI) No. 9-89228(1997)).

However, although it has been desired to provide an process for treating an exhaust gas so as to inhibit the generation of dioxin from waste incinerators, the methods described in the above publications are still unsatisfactory.

Namely, in the method described in Japanese Patent Publication (KOKOKU) No. 6-38863(1994), poly-halogenated cycloalkyl compounds and poly-halogenated aromatic compounds in fly ash generated in an incinerator are decomposed by catalysts such as iron oxide, calcium carbonate or sodium carbonate in a fixed bed. However, this method fails to completely remove dioxin, and huge plant and equipment investment is required to construct a facility for converting the fly ash into unharmful substances, at a rear stage of the incinerator. Therefore, such a construction is almost impossible practically.

In the method described in Japanese Patent Application Laid-Open (KOAKI) No. 2-280816(1990), after ammonia is added to an exhaust gas containing halogenated aromatic compounds, the halogenated aromatic compounds are decomposed in the presence of an iron oxide-containing catalyst in a fixed bed. Therefore, the construction of such a complicated facility at a rear stage of the waste incinerator also requires huge plant and equipment investment.

In the method described in Japanese Patent Application Laid-Open (KOAKI) No. 2-82411(1990), iron oxide particles and calcium carbonate particles are caused to coexist with solid wastes in the incinerator. In this method, although the generation of dioxin in a combustion chamber of the incinerator is inhibited, the generation of dioxin and dioxin precursors cannot be sufficiently prevented in the course of cooling of the exhaust gas between a downstream portion subsequent to the combustion chamber and the dust collector.

In Japanese Patent Application Laid-Open (KOAKI) Nos. 11-63467(1999) and 11-33343(1999), and Japanese Patent No. 2602085, there are described techniques of absorbing harmful substances into activated carbon, porous inorganic oxide materials or the like. Therefore, the generation of dioxin cannot be sufficiently prevented. Further, huge treatment costs are required for converting the used absorbing agents into non-harmful substances.

In the methods described in Japanese Patent Application Laid-Open (KOAKI) Nos. 8-270924(1996) and 9-89228 (1997), it is required to premix solid wastes with iron oxide particles, etc. Therefore, in view of the structure of an incinerator used therein, it is difficult to inhibit the generation of dioxin occurring either in the course of cooling of the exhaust gas between a downstream portion subsequent to the combustion chamber and the dust collector, or due to the memory effect upon low-temperature combustion caused in flues or dust collector at the start-up or shut-down of the intermittent operation-type incineration facilities.

Meanwhile, in the incineration method using iron oxide hydroxide particles or iron oxide particles containing sulfur or sodium in not more than a predetermined amount (Japanese Patent Application Laid-Open (KOAKI) No. 9-89228(1997)), the catalytic activity of the iron oxide hydroxide particles or iron oxide particles is sufficiently exhibited at a high temperature at which the incinerator is operated at a steady state. However, since the decomposition percentage at 250° C. of monochlorobenzene is disadvantageously low, the generation of dioxin either in the course of cooling of the exhaust gas between a downstream portion subsequent to the combustion chamber and the dust collector, or due to the memory effect caused in flues or dust collector at the start-up or shut-down of the intermittent operation-type incineration facilities, cannot be sufficiently inhibited, as shown in Comparative Example 5 hereinafter.

As a result of the present inventors' earnest studies for solving the above problems, it has been found that by contacting an exhaust gas having a temperature of 150 to 500° C. and existing between a downstream portion subsequent to a combustion chamber and a dust collector of an waste incinerator with an iron compound catalyst which comprises iron oxide particles or iron oxide hydroxide particles having an average particle size of 0.01 to 2.0 $\mu$m, a phosphorus content of not more than 0.02% by weight, a sulfur content of not more than 0.6% by weight and a sodium content of not more than 0.5% by weight, and which has a catalytic activity capable of decomposing not less than 20% by weight of monochlorobenzene when 50 mg of iron oxide particles obtained by heat-treating said iron compound catalyst at 300° C. for 60 minutes in air is instantaneously contacted with $5.0 \times 10^{-7}$ mol of monochlorobenzene at 300° C. at a space velocity of 150,000 $h^{-1}$ in an inert gas atmosphere using a pulse catalytic reactor, or a composite catalyst composition containing the iron compound catalyst, it is possible to effectively inhibit the generation of dioxin. The present invention has been attained on the basis of this finding.

SUMMARY OF THE INVENTION

It is an object of the present invention to provide a process for treating a dioxin-containing exhaust gas discharged from intermittent operation-type incineration facilities such as mechanical batch incinerators and semi-continuous incinerators as well as continuous operation-type incineration facilities, which can inhibit the generation of dioxin either in the course of cooling of the exhaust gas between a downstream portion subsequent to a combustion chamber and a dust collector, or due to the memory effect upon the low-temperature combustion caused in flues or dust collector at the start-up or shut-down of the intermittent operation-type incineration facilities.

It is an object of the present invention to provide a composite catalyst composition for inhibiting the generation of dioxin in intermittent operation-type incineration facilities such as mechanical batch incinerators and semi-continuous incinerators as well as continuous operation-type incineration facilities, which can inhibit the generation of dioxin either in the course of cooling of the exhaust gas between a downstream portion subsequent to a combustion chamber and a dust collector, or due to the memory effect upon the low-temperature combustion caused in flues or dust collector at the start-up or shut-down of the intermittent operation-type incineration facilities.

To accomplish the aims, in a first aspect of the present invention, there is provided a process for treating a dioxin-containing exhaust gas comprising:

adding an iron compound catalyst comprising iron oxide particles or iron oxide hydroxide particles and having a catalytic activity capable of decomposing not less than 20% by weight of monochlorobenzene when $3.1 \times 10^{-4}$ mol (50 mg) of iron oxide particles obtained by heat-treating said iron compound catalyst at 300° C. for 60 minutes in air is instantaneously contacted with $5.0 \times 10^{-7}$ mol of monochlorobenzene at 300° C. at a space velocity of 150,000 $h^{-1}$ in an inert gas atmosphere using a pulse catalytic reactor, into an exhaust gas having a temperature of 150 to 500° C. in the course of cooling between a downstream portion subsequent to a combustion chamber and a dust collector of a waste incinerator to contact the iron compound catalyst with the exhaust gas, the amount of said iron compound catalyst added being 0.01 to 2.5% by weight based on the weight of dry wastes incinerated per hour, and said iron oxide particles or said iron oxide hydroxide particles having an average particle size of 0.01 to 2.0 $\mu$m, a phosphorus content of not more than 0.02% by weight based on the weight of the particles, a sulfur content of not more than 0.6% by weight based on the weight of the particles and a sodium content of not more than 0.5% by weight based on the weight of the particles.

In a second aspect of the present invention, there is provided a process for treating a dioxin-containing exhaust gas comprising:

adding an iron compound catalyst comprising iron oxide particles or iron oxide hydroxide particles and having a catalytic activity capable of decomposing not less than 20% by weight of monochlorobenzene when $3.1 \times 10^{-4}$ mol of iron oxide particles obtained by heat-treating said iron compound catalyst at 300° C. for 60 minutes in air is instantaneously contacted with $5.0 \times 10^{-7}$ mol of monochlorobenzene at 300° C. at a space velocity of 150,000 $h^{-1}$ in an inert gas atmosphere using a pulse catalytic reactor, together with an acid gas neutralizing agent, into an exhaust gas having a temperature of 150 to 500° C. in the course of cooling between a downstream portion subsequent to a combustion chamber and a dust collector of a waste incinerator to contact the iron compound catalyst and the acid gas neutralizing agent with the exhaust gas, the total amount of said iron compound catalyst and said acid gas neutralizing agent added being 0.02 to 4.0% by weight based on the weight of dry wastes incinerated per hour, and said iron oxide particles or said iron oxide hydroxide particles having an average particle size of 0.01 to 2.0 $\mu$m, a phosphorus content of not more than 0.02% by weight based on the weight of the particles, a sulfur content of not more than 0.6% by weight based on the weight of the particles and a sodium content of not more than 0.5% by weight based on the weight of the particles.

In a third aspect of the present invention, there is provided a process for treating a dioxin-containing exhaust gas comprising:

adding an iron compound catalyst comprising iron oxide particles or iron oxide hydroxide particles having a catalytic activity capable of decomposing not less than 20% by weight of monochlorobenzene when $3.1 \times 10^{-4}$ mol of iron oxide particles obtained by heat-treating said iron compound catalyst at 300° C. for 60 minutes in air is instantaneously contacted with $5.0 \times 10^{-7}$ mol of monochlorobenzene at 300° C. at a space velocity of 150,000 $h^{-1}$ in an inert gas atmosphere using a pulse catalytic reactor, together with an acid gas neutralizing agent and an activated carbon, into an exhaust gas having a temperature of 150 to 500° C. in the course of cooling between a downstream portion subsequent to a combustion chamber and a dust collector of a waste incinerator to contact the iron compound catalyst, the acid gas neutralizing agent and the activated carbon with the exhaust gas, the total amount of said iron compound catalyst, said acid gas neutralizing agent and said activated carbon contacted being 0.02 to 5.0% by weight based on the weight of dry wastes incinerated per hour, and said iron oxide particles or said iron oxide hydroxide particles having an average particle size of 0.01 to 2.0 $\mu$m, a phosphorus content of not more than 0.02% by weight based on the weight of the particles, a sulfur content of not more than 0.6% by weight based on the weight of the particles and a sodium content of not more than 0.5% by weight based on the weight of the particles.

In a fourth aspect of the present invention, there is provided a composite catalyst composition for inhibiting the generation of dioxin, comprising:

an iron compound comprising iron oxide particles or iron oxide hydroxide particles having an average particle size of 0.01 to 2.0 $\mu$m a phosphorus content of not more than 0.02% by weight based on the weight of the particles, a sulfur content of not more than 0.6% by weight based on the weight of the particles and a sodium content of not more than 0.5% by weight based on the weight of the particles; and an acid gas neutralizing agent, said composite catalyst composition having a catalytic activity capable of decomposing not less than 25% by weight of monochlorobenzene when 50 mg of a composite material of iron oxide particles obtained by heat-treating said iron compound catalyst at 300° C. for 60 minutes in air, and said acid gas neutralizing agent is instantaneously contacted with $5.0 \times 10^{-7}$ mol of monochlorobenzene at 300° C. at a space velocity of 150,000 $h^{-1}$ in an inert gas atmosphere using a pulse catalytic reactor.

In a fifth aspect of the present invention, there is provided a composite catalyst composition for inhibiting the generation of dioxin, comprising:

an iron compound comprising iron oxide particles or iron oxide hydroxide particles having an average particle size of 0.01 to 2.0 $\mu$m, a phosphorus content of not more than 0.02% by weight based on the weight of the particles, a sulfur content of not more than 0.6% by weight based on the weight of the particles and a sodium content of not more than 0.5% by weight based on the weight of the particles;

an acid gas neutralizing agent; and an activated carbon, said composite catalyst composition having a catalytic activity capable of decomposing and adsorbing not less than 30% by weight of monochlorobenzene when 50 mg of a composite material of iron oxide particles obtained by heat-treating said iron compound catalyst at 300° C. for 60 minutes in air, said acid gas neutralizing agent and said activated carbon is instantaneously contacted with $5.0 \times 10^{-7}$ mol of monochlorobenzene at 300° C. at a space velocity of 150,000 $h^{-1}$ in an inert gas atmosphere using a pulse catalytic reactor.

DETAILED DESCRIPTION OF THE INVENTION

The present invention will now be described in detail below.

First, an iron compound catalyst for inhibiting the generation of dioxin used in the process of the present invention, is described.

The iron compound catalyst for inhibiting the generation of dioxin used in the process of the present invention, comprises at least one material selected from the group consisting of iron oxide hydroxide particles such as goethite, akaganeite and lepidocrocite, and iron oxide particles such as hematite, maghemite and magnetite.

The iron compound catalyst used in the present invention may have either a granular shape, a spherical shape, a spindle shape or an acicular shape.

The iron compound catalyst used in the present invention exhibits a catalytic activity capable of decomposing usually not less than 20% by weight of monochlorobenzene when $3.1 \times 10^{-4}$ mol (50 mg) of iron oxide particles obtained by heat-treating said iron compound catalyst at 300° C. for 60 minutes in air, is instantaneously contacted with $5.0 \times 10^{-7}$ mol of monochlorobenzene at 300° C. at a hourly space velocity of 150,000 $h^{-1}$ in an inert gas atmosphere using a pulse catalytic reactor. The iron compound catalyst has a catalytic activity capable of decomposing preferably not less than 25% by weight of monochlorobenzene. In general, since monochlorobenzene is a precursor of dioxin, the catalytic activity for the decomposition of monochlorobenzene is regarded as an index of inhibiting the generation of dioxin and dioxin precursors. Meanwhile, the decomposition percentage (conversion) of monochlorobenzene is represented by the following formula:

Conversion (%)=[1-(amount of monochlorobenzene detected/amount of monochlorobenzene initially charged)]×100

The iron compound catalyst used in the present invention, has an average particle size of usually 0.01 to 2.0 $\mu m$, preferably 0.02 to 1.0 $\mu m$. When the average particle size of the iron compound catalyst is less than 0.01 $\mu m$, such too fine particles may adversely affect a dust-collecting performance of bag filters or electric dust collectors. When the average particle size of the iron compound catalyst is more than 2.0 $\mu m$, since such large particles may not be sufficiently transported from a portion subsequent to the combustion chamber into the dust collector, it may become difficult to inhibit the generation of dioxin.

The iron compound catalyst for inhibiting the generation of dioxin used in the present invention, has a phosphorus content of usually not more than 0.02% by weight, preferably not more than 0.01% by weight, more preferably not more than 0.005% by weight. When the phosphorus content is more than 0.02% by weight, since the catalyst poison ability of the phosphorus becomes large, the catalytic activity for the decomposition of monochlorobenzene is deteriorated, so that the generation of dioxin cannot be sufficiently inhibited.

The iron compound catalyst used in the present invention, has a sulfur content of usually not more than 0.6% by weight, preferably not more than 0.3% by weight, more preferably not more than 0.1% by weight. When the sulfur content is more than 0.6% by weight, since the catalyst poison ability of the sulfur becomes large, the catalytic activity for the decomposition of monochlorobenzene may be deteriorated, so that the generation of dioxin may not be sufficiently inhibited.

The iron compound catalyst used in the present invention, has a sodium content of usually not more than 0.5% by weight, preferably not more than 0.3% by weight, more preferably not more than 0.2% by weight. When the sodium content is more than 0.5% by weight, since the catalyst poison ability of the sodium becomes large, the catalytic activity for decomposition of monochlorobenzene may be deteriorated, so that the generation of dioxin may not be sufficiently inhibited.

The iron compound catalyst used in the present invention, has a BET specific surface area of usually 0.2 to 200 $m^2/g$, preferably 0.5 to 200 $m^2/g$, more preferably 0.5 to 100 $m^2/g$.

Next, the process for producing the iron compound catalyst for inhibiting the generation of dioxin used in the process of the present invention, is described.

Among the iron compound catalysts used in the present invention, the goethite particles may be produced, for example, by passing an oxygen-containing gas such as air through a suspension containing a ferrous iron-containing precipitate such as hydroxides of iron or iron carbonates which are obtained by reacting a ferrous salt with at least one compound selected from the group consisting of alkali hydroxides, alkali carbonates and ammonia.

Among the iron compound catalysts used in the present invention, the hematite particles may be produced, for example, by heat-dehydrating or heat-treating the above obtained goethite particles at a temperature of 200 to 800° C. in air; the magnetite particles may be produced, for example, by heat-reducing the above obtained hematite particles at a temperature of 300 to 600° C. in a reducing atmosphere; and the maghemite particles may be produced, for example, by heat-oxidizing the above obtained magnetite particles in a temperature of 200 to 600° C. in air.

In the production of the iron compound catalyst used in the present invention, it is necessary to restrict the contents of phosphorus, sulfur and sodium as catalyst poisons to not more than predetermined amounts. More specifically, the contents of phosphorus, sulfur and sodium are required to be reduced by avoiding the use of phosphorus compounds such as sodium hexametaphosphate or the like usually added as a sintering preventive upon heat-calcination step, and by removing sulfur ions derived from the raw ferrous materials or sodium ions derived from alkali hydroxides or the alkali carbonates by means of purification treatments such as washing with water or the like.

Next, the composite catalyst composition for inhibiting the generation of dioxin according to the present invention, is described.

The composite catalyst composition according to the present invention comprises an iron compound and an acid gas neutralizing agent as essential constituents. As the iron compound, there is used the above-described iron compound catalyst. The acid gas neutralizing agent may be any particles ordinarily used for removing acid gases under dry condition. Specific examples of the acid gas neutralizing agents may include alkali earth metal compounds such as calcium hydroxide, calcium oxide, calcium carbonate, magnesium oxide, magnesium carbonate and dolomite; and alkali metal compounds such as lithium carbonate, sodium carbonate, sodium hydrogen carbonate and potassium hydrogen carbonate. Among these compounds, the calcium compounds are preferred, and calcium hydroxide is more preferred. These acid gas neutralizing agents may be used singly or in the form of a mixture of any two or more thereof.

The acid gas neutralizing agent used in the present invention has an average particle size ($D_{50}$) (particle size of 50% of a total volume thereof when measured by a dry particle size distribution meter) of preferably not more than 20 µm, more preferably not more than 15 µm; and a BET specific surface area of preferably not less than 0.5 $m^2/g$, more preferably not less than 1 $m^2/g$. The lower limit of the average particle size ($D_{50}$) is preferably 1 µm and the upper limit of the BET specific surface area is preferably 100 $m^2/g$.

When the average particle size ($D_{50}$) and the BET specific surface area of acid gas neutralizing agent are out of the above ranges, since such particles may not be sufficiently transported from a portion subsequent to the combustion chamber into the dust collector, it may become difficult to inhibit the generation of dioxin, or there may be tendency to reduce the dust-collecting performance of the bag filters or electric dust collectors.

The mixing of the iron compound and the acid gas neutralizing agent is preferably conducted by a dry mixer such as sand mill, Henschel mixer and Nauter mixer. The mixing enables the iron compound and the acid gas neutralizing agent to be uniformly mixed together and be contacted with each other.

The mixing weight ratio of the iron compound to the acid gas neutralizing agent is preferably from 10:1 to 1:10 (1/(0.1 to 10)), more preferably from 5:1 to 1:5 (1/(0.2 to 5)) still more preferably 1:1 to 1:5 (1/(1 to 5)). When the weight ratio is out of the above range of from 10:1 to 1:10, the decomposition of monochlorobenzene may not be sufficiently conducted.

The composite catalyst composition composed of the iron compound and the acid gas neutralizing agent according to the present invention exhibits a catalytic activity capable of decomposing preferably not less than 25% by weight, more preferably not less than 30% by weight of monochlorobenzene.

Preferably, the composite catalyst composition according to the present invention further contains an activated carbon in addition to the iron compound and the acid gas neutralizing agent.

The activated carbon used in the present invention may be activated carbon particles ordinarily used for the removal of dioxin, and has an average particle size ($D_{50}$) (particle size of 50% of a total volume thereof when measured by a dry particle size distribution meter) of preferably not more than 50 µm more preferably not more than 30 µm; and a BET specific surface area of preferably not less than 600 $m^2/g$, more preferably not less than 800 $m^2/g$. When the average particle size ($D_{50}$) and the BET specific surface area of the activated carbon are out of the above ranges, since such particles may not be sufficiently transported from a portion subsequent to the combustion chamber into the dust collector, it may become difficult to inhibit the generation of dioxin.

With respect to the mixing weight ratio between the iron compound, the acid gas neutralizing agent and the activated carbon, it is preferred that the weight ratio of the iron compound to the acid gas neutralizing agent be from 10:1 to 1:10 (1/(0.1 to 10)) and the weight ratio of the iron compound to the activated carbon be from 10:1 to 1:5 (1/(0.1 to 5)); and it is more preferred that the weight ratio of the iron compound to the acid gas neutralizing agent be from 5:1 to 1:5 (1/(0.2 to 5)) and the weight ratio of the iron compound to the activated carbon be from 10:1 to 1:3 (1/(0.1 to 3)). It is preferred that the weight ratio of the acid gas neutralizing agent to the activated carbon be from 10:1 to 1:1 (1/(0.1 to 1.0)), more preferably from 10:1 to 4:1 (1/(0.1 to 0.25)). When the weight ratio of the iron compound to the acid gas neutralizing agent is out of the above range of from 10:1 to 1:10 and the weight ratio of the iron compound to the activated carbon is out of the above range of from 10:1 to 1:5, the effect of inhibiting the generation of dioxin may not be sufficiently exhibited.

The mixing of the iron compound, the acid gas neutralizing agent and the activated carbon is preferably conducted using the above-described dry mixers.

The composite catalyst composition composed of the iron compound, the acid gas neutralizing agent and the activated carbon according to the present invention exhibits a catalytic activity capable of decomposing and absorbing preferably not less than 30% by weight, more preferably not less than 40% by weight of monochlorobenzene. Meanwhile, the decomposition and adsorption percentage (conversion) of monochlorobenzene is represented by the following formula:

$$\text{Conversion (\%)}=[1-(\text{amount of monochlorobenzene detected}/\text{amount of monochlorobenzene initially charged})]\times 100$$

Next, the process for treating a dioxin-containing exhaust gas using the iron compound catalyst or composite catalyst composition for inhibiting the generation of dioxin according to the present invention, is described.

The incinerators to which the present invention can be applied, include intermittent operation-type incinerators such as mechanical batch incinerators or semi-continuous incinerators, and continuous operation-type incinerators.

Figure 1:
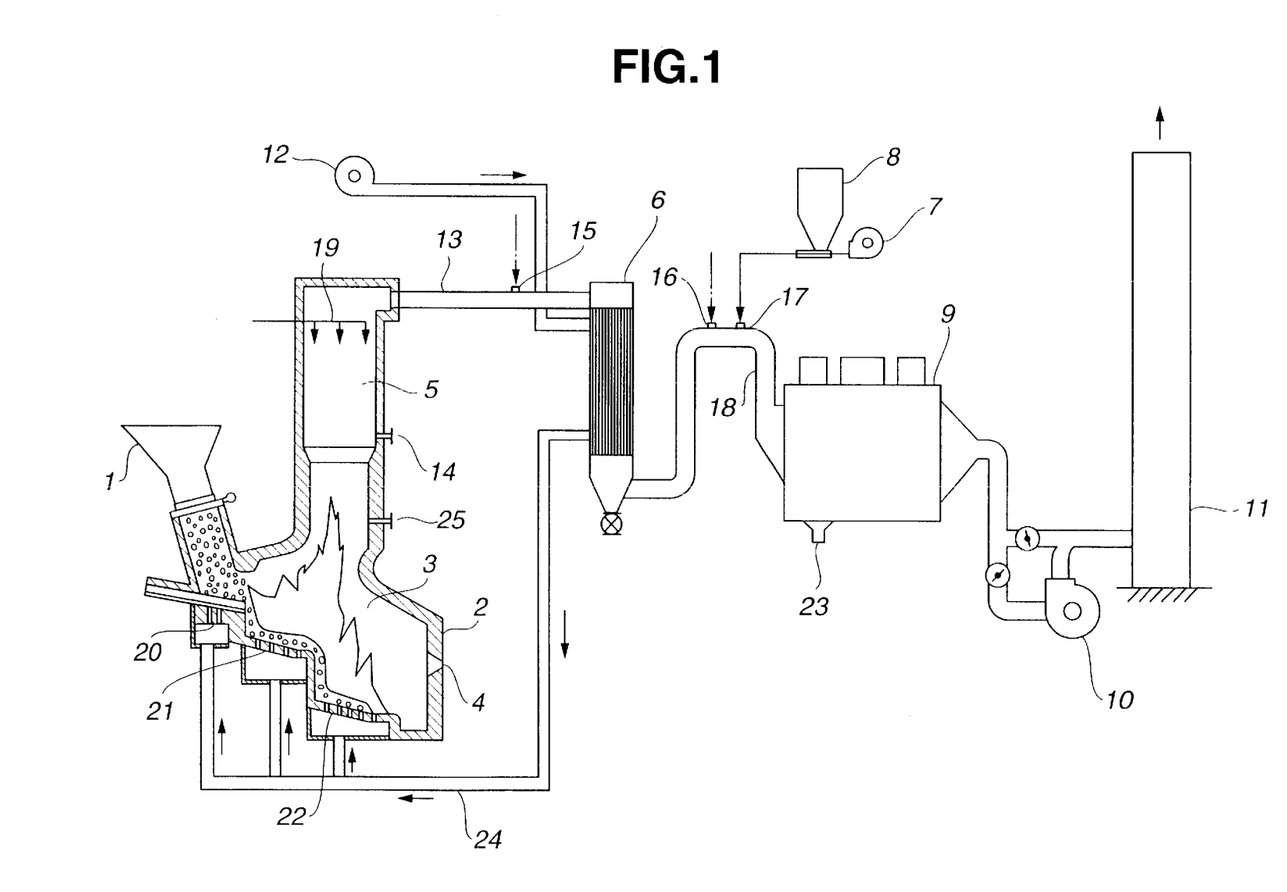
The FIGURE is a schematic view showing an example of an intermittent operation-type solid waste incineration facility usable in the present invention.

One of the intermittent operation-type incinerators usable in the present invention is schematically illustrated in the FIGURE. In the FIGURE respective reference numerals denote the following members and portions: 1: waste (municipal solid waste) hopper; 2: incinerator; 3: combustion chamber; 4: supplementary combustion burner port; 5: gas cooling chamber; 6: air preheater; 7: blower for feeding iron compound catalyst or composite catalyst composition; 8: feed tank of iron compound catalyst or composite catalyst composition; 9: dust collector; 10: induced draft fan; 11: chimney; 12: forced draft fan; 13 and 18: flues; 14 to 17 and 25: feed port for iron compound catalyst or composite catalyst composition; 19: water sprayer; 20: drying stage of incinerator; 21: combustion stage of incinerator; 22: rear combustion stage of incinerator; 23: fly ash from dust collector; and 24: combustion air.

In operation, a combustion air is introduced into the combustion chamber 3 from the bottom thereof in such an amount 1.5 to 3.5 times a theoretical combustion air amount required for complete combustion of wastes (municipal solid wastes). As the combustion air, there is used intake air received through the forced graft fan 12 and heated by the preheater 6. The combustion chamber is provided with the supplementary combustion burner port 4. The iron compound catalyst or composite catalyst composition for inhibiting the generation of dioxin, is fed through the respective feed ports 14 to 17, preferably through the feed ports 15 to 17 (namely, supplied into exhaust gases in flue 13, preheater 6 and flue 18) by a gas carrying method.

The addition of the iron compound catalyst or composite catalyst composition for inhibiting the generation of dioxin according to the present invention, may be conducted by spray-adding the iron compound catalyst or composite catalyst composition into the exhaust gas having a temperature of 150 to 500° C. and being in the course of cooling between a downstream portion subsequent to the combustion chamber and the dust collector (e.g., from the gas cooling chamber up to a portion before the dust collector), by a gas carrying method so as to bring the iron compound catalyst or composite catalyst composition into contact with the exhaust gas. In the case where the iron compound catalyst or composite catalyst composition is directly added to the combustion chamber, although the generation of dioxin in the combustion chamber is inhibited, it is not possible to sufficiently inhibit the generation of dioxin in the course of cooling of the exhaust gas between a downstream portion subsequent to the combustion chamber and the dust collector.

As the gas carrying methods, there may be used an air carrying method, a nitrogen gas carrying method or the like.

The iron compound catalyst or composite catalyst composition supplied by the gas carrying method may be in the form of either particles or a slurry, preferably in the form of particles.

The amount added of the iron compound catalyst is usually 0.01 to 2.5% by weight, preferably 0.02 to 2.0% by weight, more preferably 0.02 to 1.5% by weight based on the weight of dry wastes incinerated per hour.

The amount added of the iron compound contained in the composite catalyst composition is usually 0.01 to 2.5% by weight, preferably 0.02 to 2.0% by weight, more preferably 0.02 to 1.5% by weight based on the weight of dry wastes incinerated per hour.

When the amount of the iron compound catalyst or the iron compound contained in the composite catalyst composition added is less than 0.01% by weight, the effect of inhibiting the generation of dioxin may be unsatisfactory. When the amount of the iron compound catalyst or the iron compound contained in the composite catalyst composition added is more than 2.5% by weight, such a too large amount of the iron compound catalyst or the iron compound may overload the dust collector disposed at the rear stage, or may disadvantageously increase the amount of dusts discharged through an outlet of the dust collector.

Meanwhile, the incinerator is operated at the start-up or the shut-down thereof in the temperature range between room temperature and its steady-operation incineration temperature. In this temperature range, the municipal solid wastes within the combustion chamber tend to most frequently undergo incomplete combustion. The thus generated dioxin or dioxin precursors are retained within the flues or the dust collector without subjected to any chemical changes. Therefore, the iron compound catalyst or composite catalyst composition of the present invention is preferably continuously supplied over a whole operation period from the start-up to the shut-down of the incinerator.

The iron compound catalyst or composite catalyst composition for inhibiting the generation of dioxin according to the present invention is added to such an exhaust gas which is in the course of cooling and exists between a downstream portion subsequent to the combustion chamber and the duct collector, and adhered to the flues and retained in the dust collector along with combustion gas or fly ash, thereby preventing the generation of dioxin in the course of cooling of the exhaust gas between a downstream portion subsequent to the combustion chamber and the dust collector, and further preventing the generation of dioxin due to the memory effect upon low-temperature combustion at the start-up or shut-down of the intermittent operation-type incinerators.

The acid gas neutralizing agent may be added simultaneously with the addition of the iron compound catalyst for inhibiting the generation of dioxin. The acid gas neutralizing agent has an effect of fixing chlorine as a constituent of dioxin or dioxin precursors.

As the acid gas neutralizing agent, there may be used those having the same properties as described hereinabove. These acid gas neutralizing agents may be used singly or in the form of a mixture of any two or more thereof.

The weight ratio of the iron compound catalyst to the acid gas neutralizing agent is preferably from 10:1 to 1:10, more preferably from 5:1 to 1:5. When the weight ratio is out of the above range of from 10:1 to 1:10, the decomposition of dioxin may not be sufficiently conducted.

The total amount added of the iron compound catalyst for inhibiting the generation of dioxin and the acid gas neutralizing agent is preferably 0.02 to 4.0% by weight, more preferably 0.04 to 2.5% by weight based on the weight of dry wastes incinerated per hour.

When the total amount of the iron compound catalyst and the acid gas neutralizing agent added is less than 0.02% by weight, the effect of inhibiting the generation of dioxin may not be sufficiently exhibited. When total amount of the iron compound catalyst and the acid gas neutralizing agent added is more than 4.0% by weight, there may arise problems such as overloading of the dust collector disposed at the rear stage or significant increase in amount of dusts discharged through an outlet of the dust collector.

The iron compound catalyst and the acid gas neutralizing agent may be added separately. However, when the composite catalyst composition for inhibiting the generation of dioxin according to the present invention prepared by premixing the iron compound catalyst and the acid gas neutralizing agent together, is added, the effect of inhibiting the generation of dioxin can be further enhanced.

The amount of the composite catalyst composition for inhibiting the generation of dioxin added based on dry wastes is the same as in the case where the iron compound catalyst and the acid gas neutralizing agent are added separately.

In the process of the present invention, upon the addition of the iron compound catalyst for inhibiting the generation of dioxin, an activated carbon may be added together with the iron compound catalyst and the acid gas neutralizing agent, so that the effect of inhibiting the generation of dioxin can be further enhanced. The activated carbon has an effect of absorbing dioxin and dioxin precursors thereinto.

With respect to the mixing ratio between the iron compound catalyst, the acid gas neutralizing agent and the activated carbon, it is preferred that the weight ratio of the iron compound catalyst to the acid gas neutralizing agent be from 10:1 to 1:10 and the weight ratio of the iron compound to the activated carbon be from 10:1 to 1:5; and it is more preferred that the weight ratio of the iron compound catalyst to the acid gas neutralizing agent be from 5:1 to 1:5 and the weight ratio of the iron compound catalyst to the activated carbon be from 10:1 to 1:3. When the weight ratio of the iron compound catalyst to the acid gas neutralizing agent is out of the above range of from 10:1 to 1:10 and the weight ratio of the iron compound catalyst to the activated carbon is out of the above range of from 10:1 to 1:5, the effect of inhibiting the generation of dioxin may not be sufficiently exhibited.

The total amount added of the iron compound catalyst, the acid gas neutralizing agent and the activated carbon is preferably 0.02 to 5.0% by weight, more preferably 0.05 to 3.0% by weight based on the weight of dry wastes incinerated per hour.

When the total amount added of the iron compound catalyst, the acid gas neutralizing agent and the activated carbon is less than 0.02% by weight, the effect of inhibiting the generation of dioxin may not be sufficiently exhibited. When the total amount of the iron compound catalyst, the acid gas neutralizing agent and the activated carbon added is more than 5.0% by weight, there may arise problems such as overloading of the dust collector disposed at the rear stage or significant increase in amount of dusts discharged through an outlet of the dust collector.

The iron compound catalyst, the acid gas neutralizing agent and the activated carbon may be added separately. However, when the composite catalyst composition prepared by premixing the iron compound catalyst, the acid gas neutralizing agent and the activated carbon together is added, the effect of inhibiting the generation of dioxin can be further enhanced.

When the composite catalyst composition composed of a mixture of the iron compound catalyst, the acid gas neutralizing agent and the activated carbon is used, the amount of the composite catalyst composition added based on dry wastes is the same as in the case where the iron compound catalyst, the acid gas neutralizing agent and the activated carbon are added separately.

By conducting the process for treating an exhaust gas according to the present invention, the concentration of dioxin in the exhaust gas discharged, for example, through an outlet of an electric dust collector of waste incineration facilities can be reduced to usually not more than 3.0 ngTEQ/Nm$^3$, preferably not more than 2.5 ngTEQ/Nm$^3$ when the iron compound catalyst for inhibiting the generation of dioxin is added solely; usually not more than 2.8 ngTEQ/Nm$^3$, preferably not more than 2.3 ngTEQ/Nm$^3$ when the iron compound catalyst for inhibiting the generation of dioxin together with the acid gas neutralizing agent is added; and usually not more than 2.5 ngTEQ/Nm$^3$, preferably not more than 2.0 ngTEQ/Nm$^3$ when the iron compound catalyst for inhibiting the generation of dioxin together with the acid gas neutralizing agent and the activated carbon is added.

Further, by conducting the process for treating an exhaust gas according to the present invention, the concentration of dioxin (calculated as the weight of dusts excluding additives such as the iron compound catalyst and the like) in the fly ash generated, for example, in waste incineration facilities equipped with an electric dust collector, can be reduced to usually not more than 10 ngTEQ/g, preferably not more than 9.0 ngTEQ/g when the iron compound catalyst for inhibiting the generation of dioxin is added solely; usually not more than 9.0 ngTEQ/g, preferably not more than 8.0 ngTEQ/g when the iron compound catalyst for inhibiting the generation of dioxin together with the acid gas neutralizing agent is added; and usually not more than 8.0 ngTEQ/g, preferably not more than 7.0 ngTEQ/g when the iron compound catalyst for inhibiting the generation of dioxin together with the acid gas neutralizing agent and the activated carbon is added.

In accordance with the present invention, by adding an iron compound catalyst for inhibiting the generation of dioxin having a specific catalyst property together with an acid gas neutralizing agent or together with the acid neutralizing agent and an activated carbon, to an exhaust gas having a temperature of 150 to 500° C. and being in the course of cooling between a downstream portion of a combustion chamber and a dust collector of a waste incineration facility, it becomes possible to effectively inhibit the generation of dioxin.

The reason why the generation of dioxin is inhibited by the present invention, is considered as follows. That is, it is considered that since the iron compound catalyst for inhibiting the generation of dioxin having a specific catalyst property is added into an exhaust gas existing between a downstream portion subsequent to a combustion chamber and a dust collector, dioxin precursors contained in the exhaust gas are decomposed by the iron compound catalyst, so that the generation of dioxin due to a so-called "de novo" synthesis can be effectively prevented.

Further, in the case of intermittent operation-type solid waste incineration facilities, since the iron compound catalyst for inhibiting the generation of dioxin is retained within flues and dust collector together with fly ash even upon low-temperature combustion at the start-up and the shut-down thereof, dioxin or dioxin precursors contained in residual unburned substances in the flues and dust collector are decomposed by the iron compound catalyst, so that the generation of dioxin due to memory phenomenon can also be effectively prevented.

The reason why the effect of inhibiting the generation of dioxin can be enhanced by adding the iron compound catalyst together with an acid gas neutralizing agent, is considered as follow. That is, it is considered that since the acid gas neutralizing agent has a function of fixing chlorine as a constituent of dioxin and dioxin precursors, the generation of dioxin can be effectively prevented. When an activated carbon is further added to the iron compound catalyst together with an acid gas neutralizing agent, since dioxin or dioxin precursors adsorbed into the activated carbon is decomposed by the iron compound catalyst, the generation of dioxin can be more effectively prevented.

The reason why the generation of dioxin can be more remarkably inhibited by adding the composite catalyst composition prepared by premixing the iron compound catalyst and the acid gas neutralizing agent and optionally the activated carbon, is considered as follows. That is, when being premixed, the iron compound catalyst and the acid gas neutralizing agent or the acid gas neutralizing agent and the activated carbon are adhered to flues and retained in the dust collector while being kept uniformly contacted with each other, so that the above decomposition reaction can be more effectively conducted.

In accordance with the present invention, by adding the iron compound catalyst or composite catalyst composition for inhibiting the generation of dioxin having a specific catalyst property, to an exhaust gas having a temperature of 150 to 500° C. and being in the course of cooling between a downstream portion subsequent to a combustion chamber and a dust collector of a waste incineration facility, it becomes possible to inhibit the generation of dioxin due to the cooling, i.e., a so-called "de novo" synthesis. Further, in the case of intermittent operation-type incineration facilities, the generation of dioxin due to the memory phenomenon upon low-temperature combustion at the start-up and the shut-down thereof can also be prevented.

In addition, by using the iron compound catalyst for inhibiting the generation of dioxin in combination with the acid gas neutralizing agent and the activated carbon, the effect of inhibiting the generation of dioxin can be further enhanced.

EXAMPLES

The present invention is described in more detail by Examples and Comparative Examples, but the Examples are only illustrative and, therefore, not intended to limit the scope of the present invention.

Various properties were measured by the following methods.

(1) The average particle size of the iron compound catalyst was expressed by the value measured from an electron micrograph.

(2) The contents of phosphorus and sodium contained in iron compound catalyst were expressed by the values measured by an inductively coupled plasma atomic emission spectrometer (SPS-4000 Model, manufactured by Seiko Denshi Kogyo Co., Ltd.).

(3) The content of sulfur contained in iron compound catalyst was expressed by the value measured by a Carbon-Sulfur Analyzer (EMIA-2200 Model, manufactured by Horiba Seisakusho Co., Ltd.).

(4) The catalyst property of the iron compound catalyst was measured by the following method.

That is, $3.1 \times 10^{-4}$ mol (50 mg) of iron oxide particles ($\alpha$-$Fe_2O_3$) obtained by heat-treating the iron compound catalyst at 300° C. for 60 minutes in air, was instantaneously contacted with $5.0 \times 10^{-7}$ mol of monochlorobenzene at 300° C. at a hourly space velocity of 150,000 $h^{-1}$ in an inert gas atmosphere using a pulse catalytic reactor. The catalyst property of the iron compound catalyst is expressed by the concentration of monochlorobenzene decomposed in the above process. Here, the "SV" means a space velocity, and is expressed by the value obtained by dividing a flow rate of the reaction gas by a volume of the catalyst. The SV is represented by an inverse number of time ($h^{-1}$).

(5) The catalyst property of the composite catalyst composition was measured by the following method.

That is, 50 mg of a composite catalyst composition comprising iron oxide particles ($\alpha$-$Fe_2O_3$) obtained by heat-treated an iron compound at 300° C. for 60 minutes in air, an acid gas neutralizing agent and an activated carbon, was instantaneously contacted with $5.0 \times 10^{-7}$ mol of monochlorobenzene at 300° C. at a space velocity of 150,000 $h^{-1}$ in an inert gas atmosphere using a pulse catalytic reactor. The catalyst property of the composite catalyst composition is expressed by the concentration of monochlorobenzene decomposed and absorbed in the above process.

The pulse catalytic reactor used comprises a reactor portion and a gas chromatography portion which is constituted by Gas Chromatography-Mass Spectroscopy GC-MS (manufactured by Shimadzu Seisakusho Co., Ltd.). The evaluation method used herein was conducted by referring to methods described in the literatures (e.g., R. J. Kobes, et al, "J. Am. Chem. Soc.", 77, 5860(1955) or "Experimental Chemistry II-Reaction and Velocity" edited by Chemical Society of Japan and published by Maruzen, Tokyo (1993)).

(6) The specific surface area of the iron compound catalyst was expressed by the value measured by a BET method.

(7) The concentration of dioxin in the combustion exhaust gas was expressed by the value measured by the method approved by Waste Matter Research Foundation (15, Kagurazaka 1-chome, Shinjuku-ku, Tokyo).

Example 1

<Production of Iron Compound Catalyst for Inhibiting the Generation of Dioxin>

As the iron compound catalyst for inhibiting the generation of dioxin, there were used goethite particles having an average particle size of 0.25 μm, a phosphorus content of 0.002% by weight, a sulfur content of 0.05% by weight, a sodium content of 0.08% by weight, a decomposition percentage of monochlorobenzene of 33% when measured at 300° C. according to the above specified method, and a specific surface area of 85 $m^2/g$.

<Exhaust Gas Treatment Test>

Dry municipal solid wastes were charged into a stoker-type mechanical batch incinerator equipped with an electric dust collector (municipal solid wastes incineration capacity when operated for 16 hours a day: 30 tons per day). Then, the above goethite particles were spray-added into the exhaust gas (gas temperature: 262° C.) through a feed port 16 in an amount of 0.25% by weight based on the weight of the dry municipal solid wastes for 16 hours, i.e., for a period from the start-up to the shut-down via steady operation of the incinerator, by an air carrying method. Further, a calcium hydroxide powder (JIS Special Grade, produced by Ube materials Co., Ltd.; average particle size ($D_{50}$): 5.7 μm; BET specific surface area: 13.7 $m^2/g$) was spray-added into the exhaust gas through a feed port 17 in an amount of 0.50% by weight based on the weight of the dry municipal solid wastes for 16 hours, i.e., for a period from the start-up to the shut-down via steady operation of the incinerator, by an air carrying method.

The content of dioxin was measured with respect to the exhaust gases sampled at inlet and outlet of the electric dust collector 9 as well as fly ash collected beneath the electric dust collector. The measurement of the exhaust gases at the inlet and outlet of the electric dust collector was conducted for 4 hours subsequent to the elapse of 2 hours from the start-up of the incinerator.

The concentrations of dioxin in the exhaust gases sampled at the inlet and outlet of the electric dust collector were 4.5 ngTEQ/$Nm^3$ and 2.0 ngTEQ/$Nm^3$, respectively. The concentration of dioxin in fly ash collected beneath the electric dust collector was 6.3 ngTEQ/g.

As a blank test, the incinerator was similarly operated by spray-adding the calcium hydroxide only without the addition of the iron compound catalyst, and the exhaust gases were measured.

In the blank test, the concentrations of dioxin in the exhaust gases sampled at the inlet and outlet of the electric dust collector were 4.5 ngTEQ/$Nm^3$ and 16 ngTEQ/$Nm^3$, respectively. The concentration of dioxin in fly ash collected beneath the electric dust collector was 20 ngTEQ/g.

<Iron Compounds 1 to 5>

As the iron compound catalysts for inhibiting the generation of dioxin, iron compounds 1 to 5 were prepared. Various properties of the iron compounds are shown in Table 1.

Examples 2 to 7

<Composite Catalyst Compositions 1 to 6>

As the composite catalyst compositions for inhibiting the generation of dioxin, composite catalyst compositions 1 to 6 were prepared. Various properties of the composite catalyst compositions are shown in Table 2. As the acid gas neutralizing agents, there were used a calcium hydroxide powder (JIS Special Grade, produced by Ube Materials Co., Ltd.; average particle size ($D_{50}$): 5.7 μm; BET specific surface area: 13.7 $m^2/g$); pulverized calcium carbonate (Extra pure reagent, produced by Katayama Kagaku Kogyo Co., Ltd.; average particle size ($D_{50}$): 6.0 μm; BET specific surface area: 10.0 m$^2$/g); and pulverized potassium hydrogen carbonate (Extra pure reagent, produced by Katayama Kagaku Kogyo Co., Ltd.; average particle size (D$_{50}$): 10 μm; BET specific surface area: 3.3 m$^2$/g). Also, as the activated carbon, there was used "PXS" (tradename, produced by Mitsubishi Kagaku Co., Ltd.; average particle size (D$_{50}$): 15 μm; BET specific surface area: 1,050 m$^2$/g).

Examples 8 to 18 and Comparative Examples 1 to 6
<Exhaust Gas Treatment Test>

The same procedure for exhaust gas treatment test as defined in Example 1 was conducted except that kind of the iron compound catalyst or the composite catalyst composition, and respective amounts, addition methods and addition positions of the acid gas neutralizing agent and the activated carbon were varied. In these Examples and Comparative Examples, as the activated carbon, there was used "PXS" (tradename, produced by Mitsubishi Kagaku Co., Ltd.; average particle size (D$_{50}$): 15 μm; BET specific surface area: 1,050 m$^2$/g).

Various conditions of the exhaust gas treatment test are shown in Table 3, and the results of the exhaust gas treatment test are shown in Table 4. Meanwhile, in the Table 4, the concentration of dioxin in fly ash collected beneath the electric dust collector is expressed by the value calculated as amount of dusts excluding additives such as the iron compound catalyst and the like.

As a result, it was recognized that by conducting the exhaust gas treatment process using the iron compound catalyst or the composite catalyst composition for inhibiting the generation of dioxin according to the present invention, dioxin and dioxin precursors were successfully decomposed and absorbed, thereby effectively preventing the generation of dioxin.

TABLE 1

Properties of iron compound catalyst for inhibiting the generation of dioxin

| Iron compound catalyst | Kind | Average particle size (μm) | BET specific surface area (m$^2$/g) |
|---|---|---|---|
| Iron compound 1 | Goethite | 0.25 | 85 |
| Iron compound 2 | Goethite | 0.25 | 83 |
| Iron compound 3 | Hematite | 0.30 | 52 |
| Iron compound 4 | Goethite | 0.30 | 71 |
| Iron compound 5 | Hematite | 0.30 | 54 |

Properties of iron compound catalyst for inhibiting the generation of dioxin

| Iron compound catalyst | Phosphorus content (wt. %) | Sulfur content (wt. %) | Sodium content (wt. %) | Catalyst property (Conversion of chlorobenzene at 300° C.) (%) |
|---|---|---|---|---|
| Iron compound 1 | 0.002 | 0.05 | 0.08 | 33 |
| Iron compound 2 | 0 | 0.01 | 0.05 | 37 |
| Iron compound 3 | 0.002 | 0.01 | 0.07 | 35 |
| Iron compound 4 | 0.49 | 0.06 | 0.18 | 1.0 |
| Iron compound 5 | 0.01 | 0.01 | 0.60 | 18 |

TABLE 2

Properties of composite catalyst composition for inhibiting the generation of dioxin

| Examples | Composite catalyst composition | Kind of iron compound | Acid gas neutralizing agent Kind | Weight ratio of iron compound to acid gas neutralizing agent |
|---|---|---|---|---|
| Example 2 | Composite material 1 | Iron compound 1 | Calcium hydroxide | 1:2 |
| Example 3 | Composite material 2 | Iron compound 1 | Calcium hydroxide | 5:9 |
| Example 4 | Composite material 3 | Iron compound 3 | Calcium carbonate | 1:2 |
| Example 5 | Composite material 4 | Iron compound 3 | Calcium carbonate | 5:9 |
| Example 6 | Composite material 5 | Iron compound 3 | Potassium hydrogen carbonate | 1:2 |
| Example 7 | Composite material 6 | Iron compound 3 | Potassium hydrogen carbonate | 5:9 |

Properties of composite catalyst composition for inhibiting the generation of dioxin

| Examples | Weight ratio of iron compound to activated carbon | Catalyst property (Conversion of chlorobenzene at 300° C.) (%) |
|---|---|---|
| Example 2 | 1:0 | 43 |
| Example 3 | 5:1 | 60 |
| Example 4 | 1:0 | 46 |
| Example 5 | 5:1 | 65 |
| Example 6 | 1:0 | 47 |
| Example 7 | 5:1 | 67 |

TABLE 3

| Examples and Comparative Examples | Iron compound catalyst or composite catalyst composition for inhibiting the generation of dioxin Kind | Amount added (based on dry waste) (%) |
|---|---|---|
| Example 8 | Iron compound 1 | 0.25 |
| Example 9 | Iron compound 2 | 0.5 |
| Example 10 | Iron compound 2 | 0.50 |
| Example 11 | Iron compound 3 | 0.25 |
| Example 12 | Composite material 1 | 0.75 |
| Example 13 | Iron compound 1 | 0.25 |
| Example 14 | Composite material 2 | 0.75 |
| Example 15 | Composite material 3 | 0.75 |
| Example 16 | Composite material 4 | 0.75 |
| Example 17 | Composite material 5 | 0.75 |
| Example 18 | Composite material 6 | 0.75 |
| Comparative Example 1 | None | 0 |
| Comparative Example 2 | Iron compound 1 | 0.25 |
| Comparative Example 3 | Iron compound 2 | 0.50 |
| Comparative Example 4 | Iron compound 3 | 0.25 |
| Comparative | Iron compound 4 | 0.50 |

TABLE 3-continued

| | | |
|---|---|---|
| Example 5 Comparative Example 6 | Iron compound 5 | 0.50 |

| | Iron compound catalyst or composite catalyst composition for inhibiting the generation of dioxin | |
|---|---|---|
| Comparative Examples | Adding position | Gas temperature at adding position (° C.) |
| Example 8 | Before electric dust collector | at 16 in FIG. 1 | 260 |
| Example 9 | Before air preheater | at 15 in FIG. 1 | 351 |
| Example 10 | Before air preheater | at 15 in FIG. 1 | 352 |
| Example 11 | Before electric dust collector | at 16 in FIG. 1 | 260 |
| Example 12 | Before electric dust collector | at 17 in FIG. 1 | 261 |
| Example 13 | Before electric dust collector | at 16 in FIG. 1 | 261 |
| Example 14 | Before electric dust collector | at 17 in FIG. 1 | 263 |
| Example 15 | Before electric dust collector | at 17 in FIG. 1 | 265 |
| Example 16 | Before electric dust collector | at 17 in FIG. 1 | 264 |
| Example 17 | Before electric dust collector | at 17 in FIG. 1 | 263 |
| Example 18 | Before electric dust collector | at 17 in FIG. 1 | 262 |
| Comparative Example 1 | — | — | — |
| Comparative Example 2 | Combustion chamber | at 25 in FIG. 1 | 900 |
| Comparative Example 3 | Combustion chamber | at 25 in FIG. 1 | 890 |
| Comparative Example 4 | Combustion chamber | at 25 in FIG. 1 | 895 |
| Comparative Example 5 | Before electric dust collector | at 16 in FIG. 1 | 263 |
| Comparative Example 6 | Before air preheater | at 15 in FIG. 1 | 350 |

| | Acid gas neutralizing agent | | |
|---|---|---|---|
| Examples and Comparative Examples | Kind | Amount added (based on dry waste) (%) | Weight ratio of iron compound to acid gas neutralizing agent |
| Example 8 | None | 0 | |
| Example 9 | None | 0 | |
| Example 10 | Potassium hydrogen carbonate | 0.50 | 1:1 |
| Example 11 | Calcium hydroxide | 0.50 | 1:2 |
| Example 12 | Added as composite catalyst composition 1 | | |
| Example 13 | Calcium hydroxide | 0.45 | 5:9 |
| Example 14 | Added as composite catalyst composition 2 | | |
| Example 15 | Added as composite catalyst composition 3 | | |
| Example 16 | Added as composite catalyst composition 4 | | |
| Example 17 | Added as composite catalyst composition 5 | | |
| Example 18 | Added as composite catalyst composition 6 | | |
| Comparative Example 1 | Calcium hydroxide | 0.45 | — |
| Comparative Example 2 | Calcium hydroxide | 0.50 | 1:2 |
| Comparative Example 3 | Calcium hydroxide | 0.50 | 1:1 |
| Comparative Example 4 | Calcium hydroxide | 0.50 | 1:2 |
| Comparative Example 5 | Calcium hydroxide | 0.50 | 1:1 |
| Comparative Example 6 | Calcium hydroxide | 0.50 | 1:2 |

| | Acid gas neutralizing agent | |
|---|---|---|
| Examples and Comparative Examples | Adding method | Adding position |
| Example 8 | — | — |
| Example 9 | — | — |
| Example 10 | Alone | at 17 in FIG. 1 |
| Example 11 | Alone | at 17 in FIG. 1 |
| Example 12 | Added as composite catalyst composition 1 | |
| Example 13 | Mixed with activated carbon | at 17 in FIG. 1 |
| Example 14 | Added as composite catalyst composition 2 | |
| Example 15 | Added as composite catalyst composition 3 | |
| Example 16 | Added as composite catalyst composition 4 | |
| Example 17 | Added as composite catalyst composition 5 | |
| Example 18 | Added as composite catalyst composition 6 | |
| Comparative Example 1 | Mixed with activated carbon | at 17 in FIG. 1 |
| Comparative Example 2 | Alone | at 17 in FIG. 1 |
| Comparative Example 3 | Alone | at 17 in FIG. 1 |
| Comparative Example 4 | Alone | at 17 in FIG. 1 |
| Comparative Example 5 | Alone | at 17 in FIG. 1 |
| Comparative Example 6 | Alone | at 17 in FIG. 1 |

| | Activated carbon | |
|---|---|---|
| Examples and Comparative Examples | Added amount (based on dry waste) (%) | Weight ratio of iron compound to activated carbon |
| Example 8 | 0 | — |
| Example 9 | 0 | — |
| Example 10 | 0 | — |
| Example 11 | 0 | — |
| Example 12 | 0 | — |
| Example 13 | 0.05 | 5:1 |
| Example 14 | Added as composite catalyst composition 2 | |
| Example 15 | 0 | — |
| Example 16 | Added as composite catalyst composition 4 | |
| Example 17 | 0 | — |
| Example 18 | Added as composite catalyst composition 6 | |
| Comparative Example 1 | 0.05 | — |
| Comparative Example 2 | 0 | — |
| Comparative Example 3 | 0 | — |
| Comparative Example 4 | 0 | — |
| Comparative Example 5 | 0 | — |
| Comparative Example 6 | 0 | — |

| | Activated carbon | |
|---|---|---|
| Examples and Comparative Examples | Adding method | Adding position |
| Example 8 | — | — |
| Example 9 | — | — |
| Example 10 | — | — |
| Example 11 | — | — |
| Example 12 | — | — |
| Example 13 | Mixed with calcium hydroxide | at 17 in FIG. 1 |
| Example 14 | Added as composite catalyst composition 2 | |
| Example 15 | — | — |
| Example 16 | Added as composite catalyst composition 4 | |
| Example 17 | — | — |
| Example 18 | Added as composite catalyst composition 6 | |
| Comparative Example 1 | Mixed with calcium hydroxide | at 17 in FIG. 1 |
| Comparative Example 2 | — | — |
| Comparative Example 3 | — | — |

TABLE 3-continued

| | | |
|---|---|---|
| Comparative Example 4 | — | — |
| Comparative Example 5 | — | — |
| Comparative Example 6 | — | — |

TABLE 4

| Examples and Comparative Examples | Concentration of dioxin in exhaust gas (ngTEQ/Nm³) | | Concentration of dioxin in fly ash beneath electric dust collector (ngTEQ/g) |
|---|---|---|---|
| | Inlet of electric dust collector | Outlet of electric dust collector | |
| Example 8 | 4.6 | 2.3 | 8.0 |
| Example 9 | 3.6 | 2.0 | 7.8 |
| Example 10 | 3.7 | 1.7 | 5.5 |
| Example 11 | 4.4 | 1.9 | 6.0 |
| Example 12 | 4.5 | 1.5 | 6.0 |
| Example 13 | 4.3 | 1.1 | 6.3 |
| Example 14 | 4.4 | 0.84 | 5.9 |
| Example 15 | 4.5 | 1.5 | 5.8 |
| Example 16 | 4.6 | 0.79 | 5.5 |
| Example 17 | 4.6 | 1.4 | 5.8 |
| Example 18 | 4.5 | 0.78 | 5.4 |
| Comparative Example 1 | 4.6 | 9 | 34 |
| Comparative Example 2 | 2.7 | 3.4 | 13 |
| Comparative Example 3 | 2.6 | 3.1 | 11 |
| Comparative Example 4 | 2.6 | 3.2 | 12 |
| Comparative Example 5 | 4.5 | 15 | 18 |
| Comparative Example 6 | 4.2 | 8.2 | 15 |

What is claimed is:

1. A composite catalyst composition for inhibiting the generation of dioxin, comprising:

an iron compound comprising iron oxide particles or iron oxide hydroxide particles having an average particle size of 0.01 to 2.0 $\mu$m, a phosphorus content of not more than 0.005% by weight based on the weight of the particles, a sulfur content of not more than 0.1% by weight based on the weight of the particles and a sodium content of not more than 0.2% by weight based on the weight of the particles; and an acid gas neutralizing agent, said composite catalyst composition having a catalytic activity capable of decomposing not less than 25% by weight of monochlorobenzene when 50 mg of a composite material of iron oxide particles obtained by heat-treating said iron compound catalyst at 300° C. for 60 minutes in air, and said acid gas neutralizing agent is instantaneously contacted with $5.0 \times 10^{-7}$ mol of monochlorobenzene at 300° C. at a space velocity of 150,000 $h^{-1}$ in an inert gas atmosphere using a pulse catalytic reactor.

2. A composite catalyst composition according to claim 1, which further comprises an activated carbon.

3. A composite catalyst composition according to claim 1, wherein said iron compound catalyst further has a BET specific surface area of 0.2 to 200 $m^2/g$.

4. A composite catalyst composition according to claim 1, wherein said iron compound catalyst comprises a mixture of iron oxide hydroxide particles and iron oxide particles.

5. A composite catalyst composition according to claim 1, wherein said acid gas neutralizing agent comprises an alkali earth metal compound, an alkali metal compound or a mixture thereof.

6. A composite catalyst composition according to claim 1, wherein said acid gas neutralizing agent has an average particle size of not more than 20 $\mu$m and a BET specific surface area of not less than 0.5 $m^2/g$.

7. A composite catalyst composition according to claim 1, wherein the weight ratio of said iron compound catalyst to said acid gas neutralizing agent is from 10:1 to 1:10.

8. A composite catalyst composition according to claim 2, wherein said activated carbon has an average particle size of not more than 50 $\mu$m and a BET specific surface area of not less than 600 $M^2/g$.

9. A composite catalyst composition according to claim 2, wherein the weight ratio of said iron compound catalyst to said activated carbon is from 10:1 to 1:5.

* * * * *